US009558747B2

(12) United States Patent
Kore et al.

(10) Patent No.: US 9,558,747 B2
(45) Date of Patent: Jan. 31, 2017

(54) HIGH INTELLIGIBILITY VOICE ANNOUNCEMENT SYSTEM

(71) Applicant: Honeywell International Inc., Morristown, NJ (US)

(72) Inventors: Vinayak Sadashiv Kore, Bangalore (IN); Andrew G. Berezowski, Wallingford, CT (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/566,486

(22) Filed: Dec. 10, 2014

(65) Prior Publication Data

US 2016/0171982 A1  Jun. 16, 2016

(51) Int. Cl.
G10L 15/26 (2006.01)
G10L 13/02 (2013.01)
G10L 13/00 (2006.01)
H04R 27/00 (2006.01)

(52) U.S. Cl.
CPC ............... *G10L 15/26* (2013.01); *G10L 13/00* (2013.01); *G10L 13/02* (2013.01); *H04R 27/00* (2013.01)

(58) Field of Classification Search
CPC ................................. G10L 15/26; G10L 13/02
See application file for complete search history.

(56) References Cited

U.S. PATENT DOCUMENTS

| 5,855,000 | A | 12/1998 | Waibel et al. | |
|---|---|---|---|---|
| 6,101,467 | A * | 8/2000 | Bartosik | G10L 15/26 |
| | | | | 704/235 |
| 6,195,637 | B1 * | 2/2001 | Ballard | G10L 15/22 |
| | | | | 704/235 |
| 8,077,877 | B1 * | 12/2011 | Martin | G06Q 30/02 |
| | | | | 379/37 |
| 8,265,938 | B1 * | 9/2012 | Verna | H04W 4/021 |
| | | | | 379/37 |
| 2002/0128833 | A1 * | 9/2002 | Steinbiss | G10L 15/22 |
| | | | | 704/235 |
| 2004/0073423 | A1 * | 4/2004 | Freedman | G10L 15/02 |
| | | | | 704/235 |

(Continued)

FOREIGN PATENT DOCUMENTS

EP    2770501 A1    8/2014

OTHER PUBLICATIONS

Kim, "Development of the Digital Public Address System", 2012 8th International Conference on Computing Technology and Information Management, vol. 2, Jan. 1, 2012, 5 pp.

(Continued)

*Primary Examiner* — Samuel G Neway
(74) *Attorney, Agent, or Firm* — Brooks, Cameron & Huebsch, PLLC

(57) ABSTRACT

A high intelligibility voice announcement system is described herein. One system includes an announcement station containing a speech to text engine in which a spoken announcement from a user is converted to text data, wherein any errors are identified and marked in the converted text data and displayed to the user. After the user has corrected any errors, the corrected text data is transmitted to one or more speakers, where a text to speech engine converts the text data to an audible message that is then broadcast via the speakers.

19 Claims, 3 Drawing Sheets

(56) References Cited

U.S. PATENT DOCUMENTS

| | | | |
|---|---|---|---|
| 2005/0086051 A1* | 4/2005 | Brulle-Drews | G01C 21/3602 704/7 |
| 2006/0049934 A1* | 3/2006 | Breen | G08B 25/08 340/531 |
| 2006/0161434 A1* | 7/2006 | Faisman | G10L 15/22 704/246 |
| 2006/0182288 A1* | 8/2006 | Arcaria | H04R 29/007 381/82 |
| 2007/0061759 A1* | 3/2007 | Klein | G06F 17/30746 715/853 |
| 2007/0086595 A1* | 4/2007 | Asada | H04S 7/301 381/59 |
| 2008/0019535 A1* | 1/2008 | Mitsuhashi | H04S 7/305 381/66 |
| 2009/0319268 A1* | 12/2009 | Aumont | G10L 25/69 704/236 |
| 2010/0030557 A1* | 2/2010 | Molloy | G10L 13/00 704/235 |
| 2010/0298009 A1* | 11/2010 | Dantzler, Jr. | H04M 1/72552 455/466 |
| 2010/0324894 A1 | 12/2010 | Potkonjak | |
| 2011/0307241 A1 | 12/2011 | Waibel et al. | |
| 2013/0041646 A1* | 2/2013 | Farley | G08B 25/14 704/2 |
| 2013/0066630 A1* | 3/2013 | Roe | G10L 15/22 704/235 |
| 2014/0172426 A1* | 6/2014 | Aratsu | G10L 21/0208 704/235 |
| 2014/0214426 A1* | 7/2014 | Kanevsky | G10L 15/08 704/257 |

OTHER PUBLICATIONS

Lin, et al., "A Text-to-Speech-based Digital Public Address System for Campus Broadcasting and Language Listening Training", 2013 IEEE 17th International Symposium on Consumer Electronics (ISCE), Jun. 3, 2013, 2 pp.

Extended Search and Opinion from related European Patent Application No. 15197890, dated May 10, 2016, 8 pp.

* cited by examiner

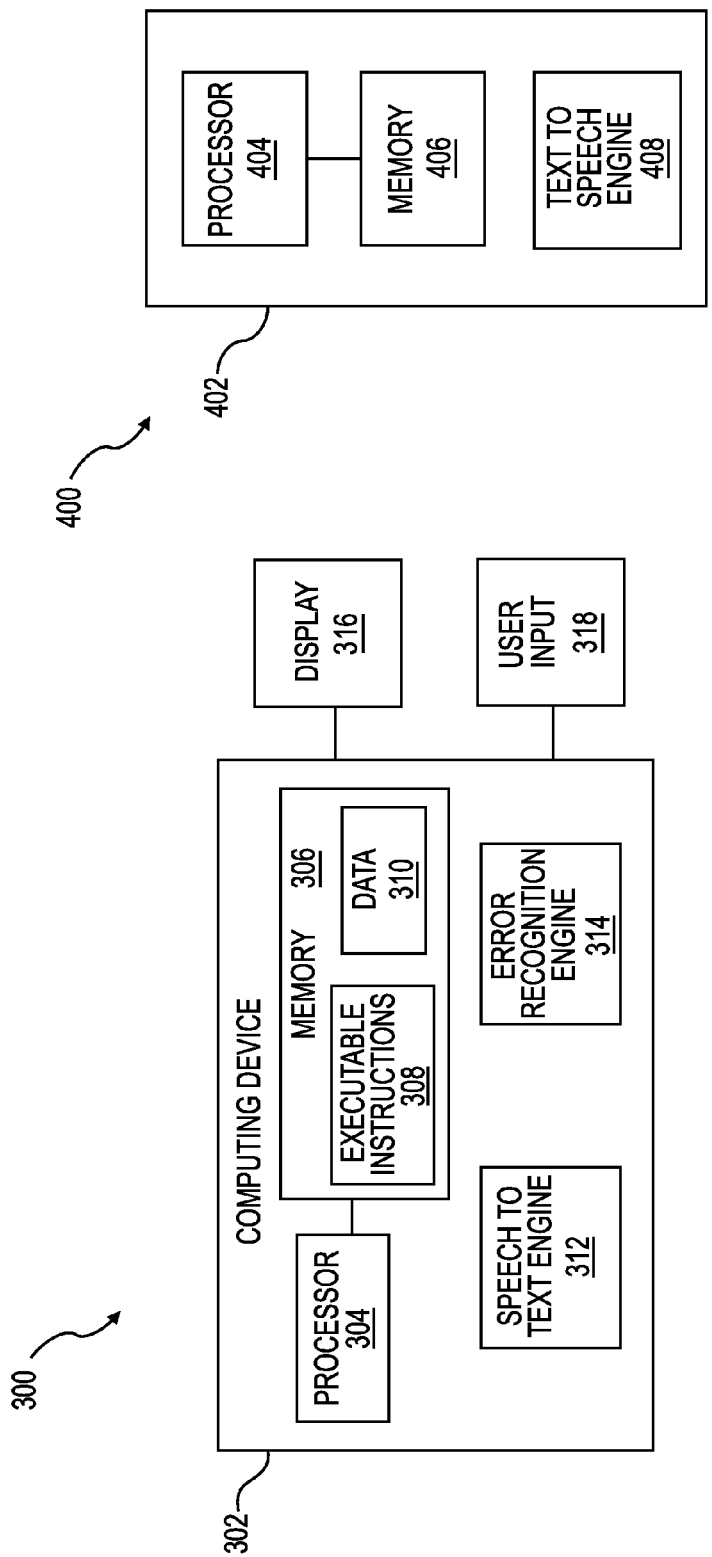

HIGH INTELLIGIBILITY VOICE ANNOUNCEMENT SYSTEM

BACKGROUND

The present disclosure is related generally to the field of public announcement systems. More particularly, the present disclosure is related to high intelligibility voice announcement systems.

In public announcement systems, live audio signals are synchronously streamed to multiple speakers for announcements in areas of buildings or on the premises of large properties. In many of these systems, the quality of the audio broadcast depends on the clarity of the user's voice. For example, the effectiveness of the announcement depends largely on the user's ability to speak in a controlled tone and clearly articulate the announcement.

However, in many situations it is difficult for the user to speak in such a controlled manner. For example, in an emergency situation, the user may talk quickly and in an excited manner due to pressure and panic. A wrong or misspoken announcement could lead to potential panic and loss of property and life.

Further issues arise in wireless implementations of such systems. In order to obtain high audio legibility, a high data rate is required to transmit the audio to the point of broadcast. Further, this high data rate can cause high power consumption in battery powered systems. The high data rate can further lead to interference issues in transmission.

BRIEF DESCRIPTION OF THE DRAWINGS

FIG. 3 is a schematic block diagram of a computing device for use with a high intelligibility voice announcement system, in accordance with one or more embodiments of the present disclosure.

FIG. 4 is a schematic block diagram of a speaker hosting a text to speech engine, in accordance with one or more embodiments of the present disclosure.

DETAILED DESCRIPTION

Figure 1:
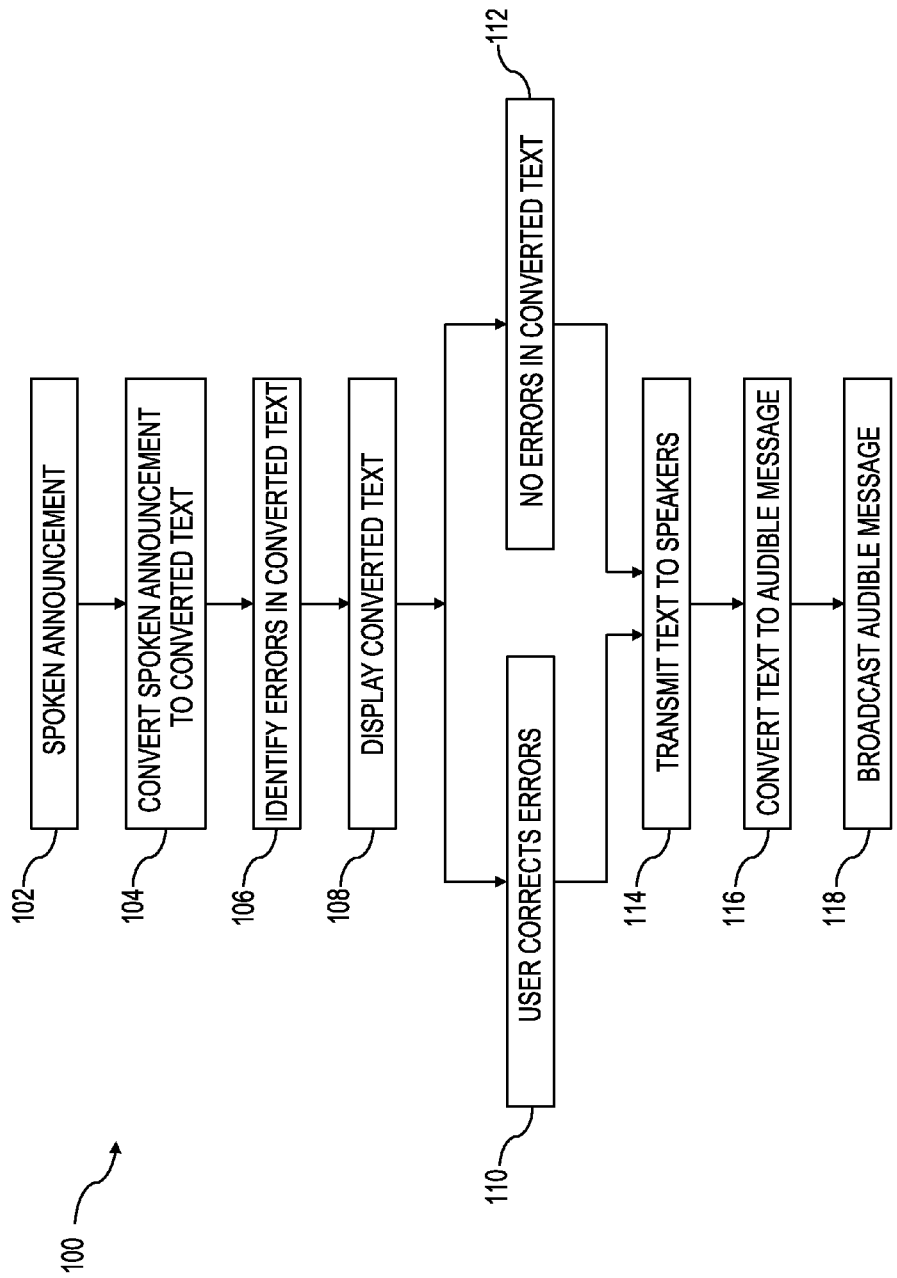
FIG. 1 is a flow chart of a method for providing a high intelligibility voice announcement system, in accordance with one or more embodiments of the present disclosure.

A high intelligibility voice announcement system is described herein. For example, one or more embodiments include an announcement station, into which a user gives a spoken announcement. The announcement station contains a speech to text engine in which the spoken announcement from the user is converted to text data. An error recognition engine scans the converted text data for any errors. Identified errors in the converted text data are marked and displayed to the user for correction.

Once the user has corrected any errors, the corrected text data is transmitted to one or more speakers. A text to speech engine, located at the one or more speakers, converts the corrected text data to an audible message that is then broadcast via the speakers.

High intelligibility voice announcement systems in accordance with the present disclosure may be able to more clearly broadcast announcements that are grammatically and logically correct. Accordingly, the chance that a grammatically or logically incorrect announcement is erroneously broadcast is reduced. Additionally, the quality of service and data rate required for transmission over a wireless network is reduced, allowing for less bandwidth to be used.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of speakers" can refer to one or more speakers. Additionally, the designators "N" and "M", as used herein, particularly with respect to reference numerals in the drawings, indicate that a number of the particular feature so designated can be included with a number of embodiments of the present disclosure.

FIG. 1 is a flow chart of a method for providing a high intelligibility voice announcement system, in accordance with one or more embodiments of the present disclosure. In the embodiment represented in FIG. 1, the method 100 converts, using an announcement station, a spoken announcement into text.

Any errors in the converted text are then identified and corrected. The text is transmitted to a device that will be used in broadcasting the announcement. Once received, the transmitted text is converted for broadcast as an audible message.

For instance, using method 100, a user can broadcast an announcement that is understandable to individuals in the broadcast area in an emergency situation, for example, when a user's tone of speech may be excited or when there may be other audible sounds in the background that could be distracting to the listener (e.g., sirens). A user, as used herein, can include a person (e.g., an employee, first responder personnel, government personnel) who is to transmit an announcement.

The announcement station, as used herein, can include a speech to text engine, an error recognition engine, a display, an input device, and a transmitter to transmit text data to one or more speakers, as further described herein. The announcement station can, for instance, be a desktop PC, laptop PC, mobile computing device, or any other similar device.

At block 102, the method 100 can include the announcement station that receives a spoken announcement from a user. The announcement station can receive the spoken announcement via a microphone. For instance, in response to an emergency situation, a user can input a spoken announcement into the announcement station, for example, to direct an evacuation of a building.

Other types of spoken announcements may include, for example, informational announcements. Informational announcements may be useful in transit stations such as airports, train stations, subway stations, and bus stations. Additionally, informational announcements may be useful in other places, such as schools or prisons.

A microphone, as used herein, can be an acoustic-to-electric transducer or sensor that converts sound (e.g., a speech command) in air into an electrical signal. The microphone can be used to capture one or more speech commands from a user. The announcement station can process the speech command (e.g., the converted electrical signal from the speech command) to computer-readable instructions that can be executed by a processor and can be stored in memory.

At block 104, the method 100 can include converting a spoken announcement to converted text. For instance, a spoken announcement can be converted to text using a speech to text engine. The speech to text engine can be configured to convert the spoken announcement as the user speaks. In some circumstances, such as emergency situations, it can be advantageous for conversion to happen quickly in order to transmit the spoken announcement as soon as possible.

In various embodiments, a speech to text engine can include hardware and/or software configured to convert a spoken announcement from a user from audio data into text data. Audio data, as used herein, can include recorded audio stored in an audio file format, including .wav, .mp3, or .wma, or any other appropriate file format for storing and playing audio content with a computing device.

In some embodiments, the speech to text engine can be software. For example, the speech to text engine can be various forms of speech to text software, including Microsoft Windows Speech Recognition, Dragon Speech Recognition Software, or Tazti Speech Recognition Software, among others.

In some embodiments, the speech to text engine can be hardware. For example, the speech to text engine can be various forms of speech to text hardware including Sunrom Speech Recognition System or Sensory Inc. Integrated Circuits, among others.

In some embodiments, a spoken announcement can be converted to text utilizing announcement situation specific processing. The speech to text engine can analyze the spoken announcement in a context specific setting to convert text data that is more accurate. For example, the speech to text engine can recognize a spoken announcement as an emergency announcement and convert the emergency announcement to text data that is more accurate based on the context of the emergency situation.

At block 106, the method 100 can include identifying errors in the converted text. For example, errors can be identified by an error recognition engine.

The error recognition engine can recognize any portions of the converted text data that may have been incorrectly converted by the speech to text engine from the user's spoken announcement. Identifying an error can include identifying errors in grammar, logic, spelling, length, context, and language errors.

For example, a speaker may speak with an accent. The error recognition engine can determine, based on the context of the surrounding words, that there is an error in the converted text data.

The error recognition can recognize portions of a spoken announcement converted to text data that may have been incorrectly spoken by the user. For example, a user may speak a spoken announcement in a logically or grammatically incorrect way. Again, the error recognition engine can determine, based on the context of the surrounding words, that there is a logical or grammatical error in the converted text data.

In some embodiments, as is shown at block 108 of the embodiment of FIG. 1, the method 100 can include displaying the converted text. For example, after the spoken announcement is converted to text data by the speech to text engine and checked for potential errors by the error recognition engine, the display can be used to show the converted text data to the user in a textual format.

In some embodiments, the converted text data shown on the display can include marks indicating any potential identified errors in the converted text data. This can be beneficial in enabling the user to quickly identify and correct the errors when speed of getting the message out is important, among other situations.

A display, as used herein, can be a display at the announcement station configured to display graphical information to the user. For instance, a display can be a television, computer monitor, mobile device screen, optical head-mounted display, or other type of display device connected to the announcement station and configured to receive a video signal output from the announcement station.

In some embodiments, the user can be notified of errors in the converted text via the display. The user may be notified of the error in any suitable manner, such as by marking the erroneous text to the user in a manner that catches the user's attention. For example, the portion of the converted text that contains an error can be marked using a bright color, underlining the erroneous text, or other methods of notification.

At block 110, the method 100 can include the user correcting errors. For instance, the error recognition engine may have identified a grammatical error in the converted text.

The user can use a user input to correct the mistake in grammar in the converted text. In various embodiments, a user input can include a microphone, a keyboard, mouse and/or other point device, touch screen, scanner, wireless communication, or other similar input means.

In various instances, a user may notice that the speech to text engine has created an error in the converted text, but the error recognition engine has not identified it. In some embodiments, the user can utilize a user input to correct the mistake in the converted text, even though the error was not identified by the error recognition engine.

In some embodiments, the error recognition engine can automatically identify and correct any errors in the converted text. For example, the error recognition engine may correct converted text that contains errors without interaction from the user. This function may be useful in situations where it is important that a message be broadcast quickly.

At block 112, the method 100 can include having no errors in the converted text. For instance, the error recognition engine may not have identified any errors in the converted text. In this case, the user is not required to correct any identified errors, so no errors are displayed to the user. In some embodiments, the system can provide a message to the user (e.g., via the display) indicating that there are no errors to be corrected. This may be beneficial to speed the readiness of the announcement for broadcasting.

At block 114, the method 100 can include transmitting the text to the speakers. For instance, the announcement station can transmit the corrected text data to one or more speakers, wherein the one or more speakers are connected to the announcement station via a network.

The one or more speakers receive the corrected text data via a wired or wireless network. As used herein, one or more speakers are one or more devices that allow for the audible broadcast of a message.

As discussed above, in some embodiments, the network can be a wired network. For example, the announcement station can have a dedicated wired connection to the speakers. Wired, as used herein, can include a dedicated speaker wiring system or can utilize other existing building systems including fire alarms, HVAC system wiring, or other systems to provide a wired connection between the one or more speakers and the announcement station.

In some embodiments, the network can be a wireless network. The corrected text data can be transmitted to the one or more speakers through the wireless network via a transmitter associated with the announcement station. As used herein, a transmitter can be a device that sends data wirelessly to a receiver.

In some embodiments, the network can enter a sleep mode to keep power consumption minimal while the announcement system is not in use. The network can maintain time sync through periodic health/sync messages. When the user intends to transmit an announcement, the network can exit the sleep mode upon detection of the user accessing the announcement station. The exit time of the network from sleep mode can be minimal as to not delay transmission of the announcement.

In various embodiments, the user can receive a notification when the system is ready for an announcement (e.g., has exited sleep mode). A notification can include an audio indication such as a beep or dial tone, or a visual indication such as an LED signal.

Once the network is awake, it can remain fully awake to support the necessary data rate for transmission of an announcement, or until silence is observed for a period of time. This time period can be user configurable, allowing the user to specify a longer or shorter duration. Once the announcement is finished, the system can again enter sleep mode.

In some embodiments, the announcement station can create a user configurable delay before transmitting the corrected text data via the network. The duration of the delay can be programmable to allow for a longer or shorter duration before transmission of the corrected text data to the speakers.

Additionally, the delay can be indefinite to allow the user as much time as needed to correct any errors before transmitting the corrected text data. In such an embodiment, the user can choose when to transmit the corrected text data.

In various embodiments, the announcement station can display the corrected text data in a queue system until the corrected text data is transmitted. For example, in airport gate announcement systems, the converted text data can be displayed on the announcement system display until the announcement is ready to be transmitted. This gives the user the option to correct, update, or cancel the announcement.

At block 116, the method 100 can include converting the text to an audible message. For instance, the one or more speakers can convert the corrected text data to an audible message utilizing the text to speech engine located at the one or more speakers.

Converting the text to an audible message can include using natural speech synthesis techniques. For example, the text to speech engine can convert corrected text data received from the announcement station and generate an audible message to be broadcast. An audible message, as used herein, can be an artificial production of human speech made up of the user's spoken words, speech created by a computing device, or spoken words stored in memory, for example.

In various embodiments, the text to speech engine can include hardware and/or software. For example, various forms of hardware for text to audio conversion can include Magnevation SpeakJet, Epson DECTalk Based Voice, or Textspeak TTS-EM, among others. Additionally, various forms of software can be utilized for text to audio conversion, including but not limited to LumenVox Text to Speech Software or NeoSpeech Text to Speech Software, among others.

At block 118, the method 100 can include broadcasting an audible message using one or more speakers. For instance, the one or more speakers can broadcast the audible message to travelers at an airport to notify travelers of a delay in departure time. A speaker, as used herein, can include an electroacoustic transducer that produces sound (e.g., artificial human speech generated by the text to speech engine).

In various embodiments, the announcement station can be used to select various zones that the text data is transmitted to. Each zone can contain a subset of the one or more speakers, as will be further described herein.

In various embodiments, the one or more speakers can, for example, include one or more diagnostic tools configured to prevent broadcasting audible messages during periodic test trials of the one or more speakers. For instance, periodic test trials can be used to determine whether the announcement system is in working order. Diagnostic tools, which can include, for example, microphones or strobe activation detectors, can be utilized during periodic test trials such that the system can be tested without disturbing persons in proximity to the one or more speakers.

Figure 2:
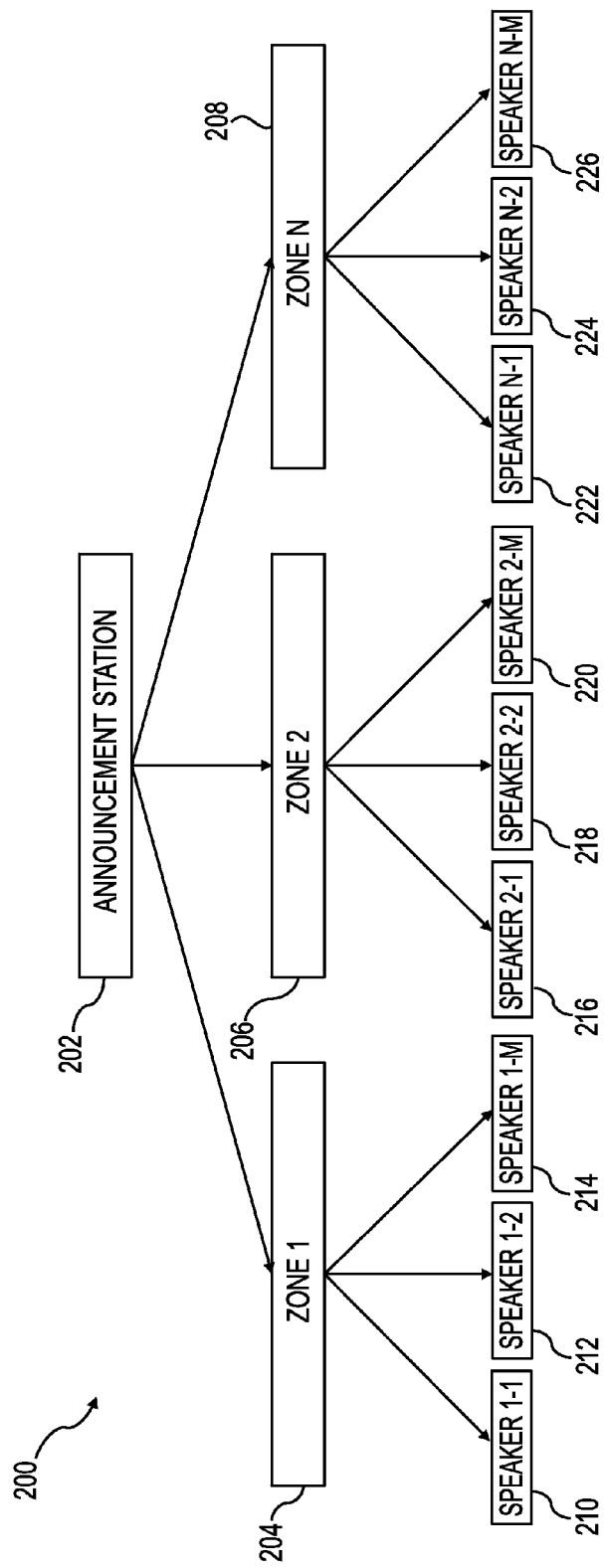
FIG. 2 is an illustration of an environment for a high intelligibility voice announcement system, in accordance with one or more embodiments of the present disclosure.

FIG. 2 is an illustration of an environment for a high intelligibility voice announcement system, in accordance with one or more embodiments of the present disclosure. The environment 200 includes an announcement station 202, one or more zones 204, 206, and 208, and one or more speakers, 210-226, in accordance with one or more embodiments of the present disclosure. For instance, using the environment 200, a user can direct a spoken announcement to be broadcast in various zone and/or speaker combinations, as will further be described herein.

Although various zone and speaker combinations and sub-combinations are illustrated and discussed in relation to FIG. 2, other combinations of zones and/or sub-combinations of speakers within the zones can be included within other implementations. For example, although three potential zones are shown, the system may have one zone or one speaker or, as little as one zone and as little as one speaker within the one zone can be selected by the announcement station 202, in some embodiments.

As shown in FIG. 2, announcement station 202 can be in communication one or more zones (e.g., Zone 1, Zone 2, . . . Zone N), wherein N designates any number of zones, each zone containing one or more speakers. Zones may be defined to fit the needs of each area requiring speaker coverage.

For example, an airport may require zones defined to cover individual boarding locations. As the reader will understand, at least one zone, containing at least one speaker, must be selected by the user as the destination for transmission of the corrected text data.

In various embodiments, zones can have one or more speakers. For instance, as illustrated in the embodiment of FIG. 2, zone 204 (Zone 1) may contain two speakers, speaker 210 (Speaker 1-1) and speaker 212 (Speaker 1-2). Alternatively, Zone 1 may contain more than two speakers, indicated by speaker 214 (i.e., Speaker 1-M, wherein the M is used to designate any amount of speakers and the 1 designates that those speakers are within Zone 1).

The one or more speakers in a zone can be defined by the audio coverage of the type of speaker. For example, a zone containing 10,000 square feet of space could be sufficiently covered by utilizing 10 speakers, each speaker having 1,000 square feet of coverage.

In various embodiments, the announcement station can be used to select individual zones or a combination of zones that the text data is transmitted to. For example, if the announcement system contains four zones (e.g., Zone 1, Zone 2, Zone 3, and Zone 4), the user can select only Zone 1 and Zone 4 for transmission of the announcement. Consequently, Zones 2 and 3 would not receive transmission of the announcement. Zones can be selected by the user at the announcement station using inputs such as a keyboard, mouse and/or other point device, touch screen, scanner, wireless communication, or other similar input means.

In some embodiments, multiple different announcement stations can send multiple announcements to multiple different zones. The multiple announcement stations can automatically use efficient routing schemes for transmitting the multiple announcements to the multiple different zones. For example, an announcement station that is physically located closer to a zone can transmit an announcement to that zone, rather than an announcement station physically located farther away from that zone. Alternatively, announcement stations can transmit messages to different zones based on other factors such as network conditions at the time of the announcement.

The one or more speakers can be time synchronized when broadcasting a message. For example, when receiving an announcement from an announcement station, the received text data can contain a time stamp. Each of the number of speakers selected to broadcast the announcement will maintain audio sync with neighboring speakers by utilizing the time stamp in the received text data.

A time stamp, as used herein, can include information in received text data that can determine when a selected speaker or number of speakers may start, stop, or pause the broadcast of a message. For example, a speaker may receive text data with a time stamp (an indicated particular time, e.g., 12:10:52 pm) and this time stamp can be used as a start time, stop time, pause time in the future when setting up the broadcast. Further, the time stamp may indicate the speaker to include a pause during the broadcast of the message at the time of the time stamp.

Speakers utilizing a time stamp can also maintain audio synchronization during broadcast. Audio synchronization between a number of speakers can ensure that the message begins broadcasting at the same time. For example, if a message is to begin broadcasting at the same time at a number of speakers covering a common area, the audio synchronization can reduce the possibility that a message will begin broadcast at different times (e.g., a short lag in the start of the broadcast suffered by one speaker), and thereby reduce the chance of any confusion by persons located within the common area due to the message being unintelligible.

In various embodiments, a delay can be introduced between neighboring speakers during broadcast to maintain intelligibility of the announcement. For example, a first speaker or zone of speakers may be located a long distance from a second speaker or zone of speakers. This distance between speakers/zones may necessitate a delay in broadcasting the announcement in the second speaker/zone from the first speaker/zone.

The need for the delay and the length of the delay can be determined automatically by the speakers. For example, the speakers can utilize built in diagnostic tools (e.g., microphones) to determine the need for a broadcast delay between speakers or zones. Determination of the need for a broadcast delay can, for instance, be discovered during network formation or during period test trials.

Alternatively, the need for the delay and the length of the delay can be determined by a user. For example, the user may specify, via an announcement station, that a selected zone or a number of speakers within a zone should contain a delay in broadcast. The user can specify, for instance, which speakers or zones should contain a delay in broadcast, the order of broadcast, or the length of the delay in between broadcast of an announcement.

In various embodiments, the speakers can be powered utilizing a dedicated power source, a battery, or a combination thereof. For example, the speakers can be powered using existing power supplies installed in a building for fire, security, or HVAC control systems. Alternatively, the speakers can be powered solely by a battery or their own dedicated line power or by using a combination of a battery and line power.

FIG. 3 is a schematic block diagram of a computing device for use with a high intelligibility voice announcement system, in accordance with one or more embodiments of the present disclosure. FIG. 3 includes a computing device 302 hosting a speech to text engine 312 and an error recognition engine 314.

Computing device 302 can include a memory 306 and a processor 304 coupled to the memory 306. The memory 306 can be any type of storage medium that can be accessed by the processor 304 to perform various examples of the present disclosure. For example, the memory 306 can be a non-transitory computer readable medium having computer readable instructions (e.g., computer program instructions) stored thereon that are executable by the processor 304 to perform various examples of the present disclosure.

The memory 306 can be volatile or nonvolatile memory. The memory 306 can also be removable (e.g., portable) memory, or non-removable (e.g., internal) memory. For example, the memory 306 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory. Further, the memory 306 can be located in the computing device 302, or internal to another computing component (e.g., enabling computer readable instructions to be downloaded over the Internet or another wired or wireless connection).

In various embodiments, the computing device 302 can include a speech to text engine 312. The speech to text engine 312 can include hardware and/or executable instructions to receive an audio input and convert the audio input into text data.

For example, the speech to text engine 312 can receive an audio input (e.g., a spoken announcement from a user) and convert the spoken announcement into converted text data. In various instances, the speech to text engine can be located within computing device 302 or externally on a cloud network device or other server device and can communicate with computing device 302 using a communication system (e.g., the Internet and/or other network).

In various embodiments, the computing device 302 can include an error recognition engine 314. The error recognition engine 314 can include hardware and/or executable instructions to scan text data for potential errors in the text data. For example, the error recognition engine 314 can scan text data for errors occurring in conversion from audio to text or as spoken by the user (e.g., grammar, logic, spelling, length, context, and language errors). In various instances, the error recognition engine can be located within computing device 302 or externally on a cloud network device or other server device and can communicate with computing device 302 using a communication system (e.g., the Internet and/or other network).

The computing device 302 can include a user input 318. A user may enter commands and information into the computing device through the user input 318. In some embodiments, the user input may not be included in the computing device, but can communicate with computing device 302 using a communication system (e.g., the Internet and/or other network).

For example, user input 318 can include a microphone for recording a spoken announcement. Additionally, user input 118 can include a keyboard, mouse and/or other point device, touch screen, scanner, wireless communication, or other input mechanism. The input devices can be connected to the computing device 302 through any suitable interface (e.g., a wired communication such as via a parallel port, game port, a universal serial bus (USB), a wireless communication such as a local communication with the computing device or via a communication system such as the Internet and/or other network).

In some embodiments, the memory 306 and the processor 304 can be a portion of the engines (e.g., the speech to text engine 312 and the error recognition engine 314). An engine, as used herein, can be hardware and/or executable instructions that is configured to perform a number of functions described herein. For instance, the hardware and/or executable instructions of the engine used to perform the number of functions can include the memory 306 and the processor 304 and computing device executable instructions stored in the memory 306 and executed by the processor 304.

Alternatively, one or more of the engines can include hardware and/or executable instructions that is separate from the memory 306 and the processor 304. For example, one or more engines can include a separate processor and/or memory, and/or can include logic to perform the number of functions described herein. In various instances, the separate processor and/or memory can be remotely located and can communicate with the computer-generated speech device 302 using a communication system (e.g., the Internet and/or other network).

In various embodiments of the present disclosure, the computing device 302 can include a display 316 that is configured to display graphical information to the user. For example, display 316 can display the spoken announcement to the user. Additionally, potential errors that have been found by error recognition engine 314 can be identified for the user on the display 316. A monitor or other type of display device can also be connected to the system via any suitable interface, such as a video adapter.

FIG. 4 is a schematic block diagram of a speaker hosting a text to speech engine, in accordance with one or more embodiments of the present disclosure. The embodiment of FIG. 4 includes a speaker 402 hosting a text to speech engine 408. Speaker 402 can include a memory 406 and a processor 404 coupled to the memory 406. Similar to the embodiment of FIG. 3, the memory 406 can be any type of storage medium that can be accessed by executable instructions executed by the processor 404 to perform various examples of the present disclosure.

In various embodiments, the speaker 402 can include a text to speech engine 408. The text to speech engine can include hardware and/or executable instructions to receive text data and convert the text data to an audible message. For example, the text to speech engine can receive a converted and corrected set of text data from computing device 302, and convert the text data into an audible message (e.g., an announcement to be broadcast). In various instances, the text to speech engine can be located within speaker 402 or externally on a cloud network device or other server device and can communicate with speaker 402 using a communication system (e.g., the Internet and/or other network).

Speaker 402 is configured to broadcast an audible message to areas of a building or premises (e.g., the grounds of a resort, military compound, etc.). Speaker 402 can be one of various types of speakers, including wall speakers, ceiling speakers, or horn speakers. The type of speaker 402 can be selected based on the type of announcement system needed for a certain application. For example, an announcement system in a school could utilize both ceiling speakers and wall speakers. Additionally, an announcement system for an outdoor area such as a concert venue could utilize horn speakers or other suitable speaker types.

As used herein, "hardware logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that hardware logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A high intelligibility voice announcement system, comprising:
   an announcement station, including:
      a speech to text engine configured to convert a spoken announcement from a user to converted text data;
      an error recognition engine configured to identify any errors in the converted text data;
      a display on the announcement station configured to display the converted text data, wherein:
         the identified errors in the converted text data are identified for the user; and
         corrected text data is displayed, via the display on the announcement station, in a queue system including other announcements until corrected text data of the spoken announcement is ready to be sent;
      an input device allowing the user to correct any identified errors in the converted text data, resulting in the corrected text data;
      a number of zones each including one or more speakers; and
      a transmitter configured to send the corrected text data to the one or more speakers of the number of zones; and
   a text to speech engine configured to convert the corrected text data to an audible message in preparation for broadcast via the one or more speakers, wherein the broadcast of the audible message is delayed via a configurable delay that is different for the one or more speakers in different ones of the number of zones.

2. The high intelligibility voice announcement system of claim 1, wherein the one or more speakers include diagnostic tools configured to determine a length of the configurable delay for the one or more speakers in the number of zones.

3. The high intelligibility voice announcement system of claim 1, wherein the identified errors in the converted text data are corrected using one or more of user speech inputs and a keyboard.

4. The high intelligibility voice announcement system of claim 1, wherein at least one of the speech to text engine or the error recognition engine is located at one of the announcement station or externally at a server connected via the Internet.

5. The high intelligibility voice announcement system of claim 1, wherein the one or more speakers include one or more diagnostic tools configured to prevent broadcasting audible messages during periodic test trials.

6. The high intelligibility voice announcement system of claim 1, wherein the text to speech engine is located at the one or more speakers or externally via a server or Internet connection.

7. The high intelligibility voice announcement system of claim 1, further comprising a network, wherein the one or more speakers are connected to the announcement station via the network.

8. A method for a high intelligibility voice announcement system, comprising:
   converting a spoken announcement from a user to converted text data;
   checking the converted text data to identify any errors;
   displaying the converted text data via a display, wherein any errors in the converted text data are identified for the user;
   correcting any errors in the converted text data resulting in corrected text data;
   displaying the corrected text via the display in a queue system that includes other announcements until the corrected text data is transmitted;
   transmitting the corrected text data via a network;
   receiving the corrected text data at one or more speakers included in a number of zones;
   converting the corrected text data to an audible message; and
   broadcasting the audible message via a configurable delay via the one or more speakers, wherein the configurable delay is different for the one or more speakers in different ones of the number of zones.

9. The method of claim 8, further comprising at least two zones, wherein the zones each contain a subset of the one or more speakers.

10. The method of claim 8, wherein the corrected text data is transmitted to at least one zone.

11. The method of claim 10, wherein the zones that the text data is transmitted can be selected by the user via an announcement station utilizing one or more of:
   a touch screen; and
   a retina movement detection system.

12. The method of claim 8, wherein the spoken announcement is converted to converted text data as the user speaks.

13. The method of claim 8, wherein converting the spoken announcement to converted text data includes using announcement situation specific processing.

14. The method of claim 8, wherein the errors include one or more of grammar, logic, spelling, length, context, and language errors.

15. The method of claim 8, wherein an announcement station creates a user configurable delay before transmitting the corrected text data via the network.

16. A high intelligibility voice announcement system, comprising:
   a computing device including:
      a memory; and
      a processor coupled to the memory, wherein the processor is configured to execute executable instructions stored in the memory to:
         convert a spoken announcement from a user to converted text data;
         identify any errors in the converted text data;
         display the converted text data via a display, wherein;
            any errors in the converted text data are identified for the user; and
            corrected text data is displayed, via the display, in a queue system including other announcements, until corrected text data of the spoken announcement is ready to be transmitted;
         correct any identified errors in the converted text data, resulting in the corrected text data; and
         transmit the corrected text data via a network; and
      a number of zones including one or more speakers that receive the corrected text data, wherein a broadcast of an audible message of the corrected text data is delayed via a configurable delay that is different for the one or more speakers in different ones of the number of zones.

17. The system of claim 16, wherein the one or more speakers convert the corrected text data to an audible message.

18. The system of claim 16, wherein the corrected text data contains a time stamp that controls one or more of a start, stop, or pause of the broadcast of the audible message.

19. The high intelligibility voice announcement system of claim 1, wherein the configurable delay is selected using one or more of user speech inputs and a keyboard.

* * * * *